United States Patent
Stonestreet, II et al.

(10) Patent No.: US 7,602,081 B2
(45) Date of Patent: Oct. 13, 2009

(54) SYSTEM AND METHOD FOR PROVIDING POWER AND CONTROL THROUGH A ROTATING INTERFACE

(75) Inventors: Arlie D. Stonestreet, II, Manhattan, KS (US); Harold G. Kraus, Manhattan, KS (US); Darin E. Genereux, Manhattan, KS (US)

(73) Assignee: Ice Corporation, Manhattan, KS (US)

( * ) Notice: Subject to any disclaimer, the term of this patent is extended or adjusted under 35 U.S.C. 154(b) by 0 days.

(21) Appl. No.: 12/029,229

(22) Filed: Feb. 11, 2008

(65) Prior Publication Data

US 2008/0129116 A1    Jun. 5, 2008

Related U.S. Application Data

(63) Continuation of application No. 11/560,029, filed on Nov. 15, 2006, now Pat. No. 7,355,302.

(60) Provisional application No. 60/739,721, filed on Nov. 23, 2005.

(51) Int. Cl.
*H02J 1/10* (2006.01)
(52) U.S. Cl. ....................................... 307/29
(58) Field of Classification Search .................... 307/29
See application file for complete search history.

(56) References Cited

U.S. PATENT DOCUMENTS

| | | | |
|---|---|---|---|
| 3,648,070 A | 3/1972 | Eicher | |
| 3,721,830 A | 3/1973 | Oishi | |
| 4,348,582 A | 9/1982 | Budek | |
| 5,264,823 A | 11/1993 | Stevens | |
| 5,572,178 A * | 11/1996 | Becker et al. | ................ 336/120 |
| 5,691,691 A | 11/1997 | Merwin | |
| 6,570,493 B1 * | 5/2003 | Rotem | ................... 340/310.11 |
| 2003/0180145 A1 * | 9/2003 | Goldberg | ........................ 416/1 |
| 2005/0007257 A1 | 1/2005 | Rast | |

OTHER PUBLICATIONS

"PCT/US06/44804", *PCT International Search Report*, (Aug. 30, 2007).

* cited by examiner

*Primary Examiner*—Robert L. Deberadinis
(74) *Attorney, Agent, or Firm*—Mark E. Brown (57) ABSTRACT

Embodiments of the present invention provide a system (10) operable to provide power and control through a rotating interface. The system (10) generally includes a control unit (12) and a distributor unit (14). The control unit (12) is operable to generate a power signal having a plurality of power transitions. The distributor unit (14) is operable to rotatably couple with the control unit (12), receive the power signal from the control unit (12), identify power transitions within the power signal, and generate a plurality of output signals corresponding to the identified power transitions. The distributor unit (14) is also at least substantially powered by the power signal to enable generation of the output signals.

24 Claims, 10 Drawing Sheets

HEATING ZONE ARRANGEMENT

BLADE IDENTIFICATION

FIG. 12

SYSTEM AND METHOD FOR PROVIDING POWER AND CONTROL THROUGH A ROTATING INTERFACE

RELATED APPLICATION

The present non-provisional application is a continuation of U.S. patent application Ser. No. 11/560,029, entitled "SYSTEM AND METHOD FOR PROVIDING POWER AND CONTROL THROUGH A ROTATING INTERFACE," filed Nov. 15, 2006, which claims the benefit of U.S. Provisional Application No. 60/739,721, entitled "SYSTEM AND METHOD OF ICE PROTECTION POWER AND CONTROL THROUGH A ROTATING INTERFACE USING A MINIMUM OF CONDUCTORS," filed Nov. 23, 2005. The identified regular utility and provisional applications are incorporated herein by specific reference.

BACKGROUND OF THE INVENTION

1. Field of the Invention

Embodiments of the present invention relate to systems and methods for providing power and control through a rotating interface. More particularly, various embodiments of the present invention relate to systems and methods that provide power and control through a rotating interface by utilizing power transitions within a power signal.

2. Description of the Related Art

It is often desirable to provide power and control signals through a rotating interface. For example, rotary components such as aircraft propeller blades often include a plurality of electrical deicing elements for ice protection. To provide power and control to each of these deicing elements, conventional systems require at least one slip ring to be employed for each control and power line. Although attempts have been made to provide power and control signals through a single conductor in a rotating interface, and therefore limit the number of required slip rings, such attempts have required complicated digital signal modulation, which increases system complexity and provides poor functionality in noisy environments.

SUMMARY OF THE INVENTION

Embodiments of the present invention solve the above-described problems and provide a distinct advance in the art of power and control systems. More particularly, various embodiments of the invention relate to systems and methods that provide power and control through a rotating interface by utilizing power transitions within a power signal.

In one embodiment, the system generally includes a control unit and a distributor unit. The control unit is operable to generate a power signal having a plurality of power transitions. The distributor unit is operable to rotatably couple with the control unit, receive the power signal from the control unit, identify power transitions within the power signal, and generate a plurality of output signals corresponding to the identified power transitions. The distributor unit is also at least substantially powered by the power signal to enable generation of the output signals.

Other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of various embodiments of the invention.

DETAILED DESCRIPTION OF THE PREFERRED EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Turning now to the drawing figures, and particularly FIGS. 1-12, a power and control system 10 is shown constructed in accordance with various preferred embodiments of the present invention. The system 10 broadly comprises a control unit 12 and a distributor unit 14 operable to be rotatably coupled with the control unit 12. As is discussed in more detail below, the control unit 12 is operable to mount to a static portion of an aircraft, the distributor unit 14 is operable to mount to a rotating portion of the aircraft, such as a propeller, and the control unit 12 is operable to provide a power signal to the distributor unit 14 for power and control purposes.

Figure 1:
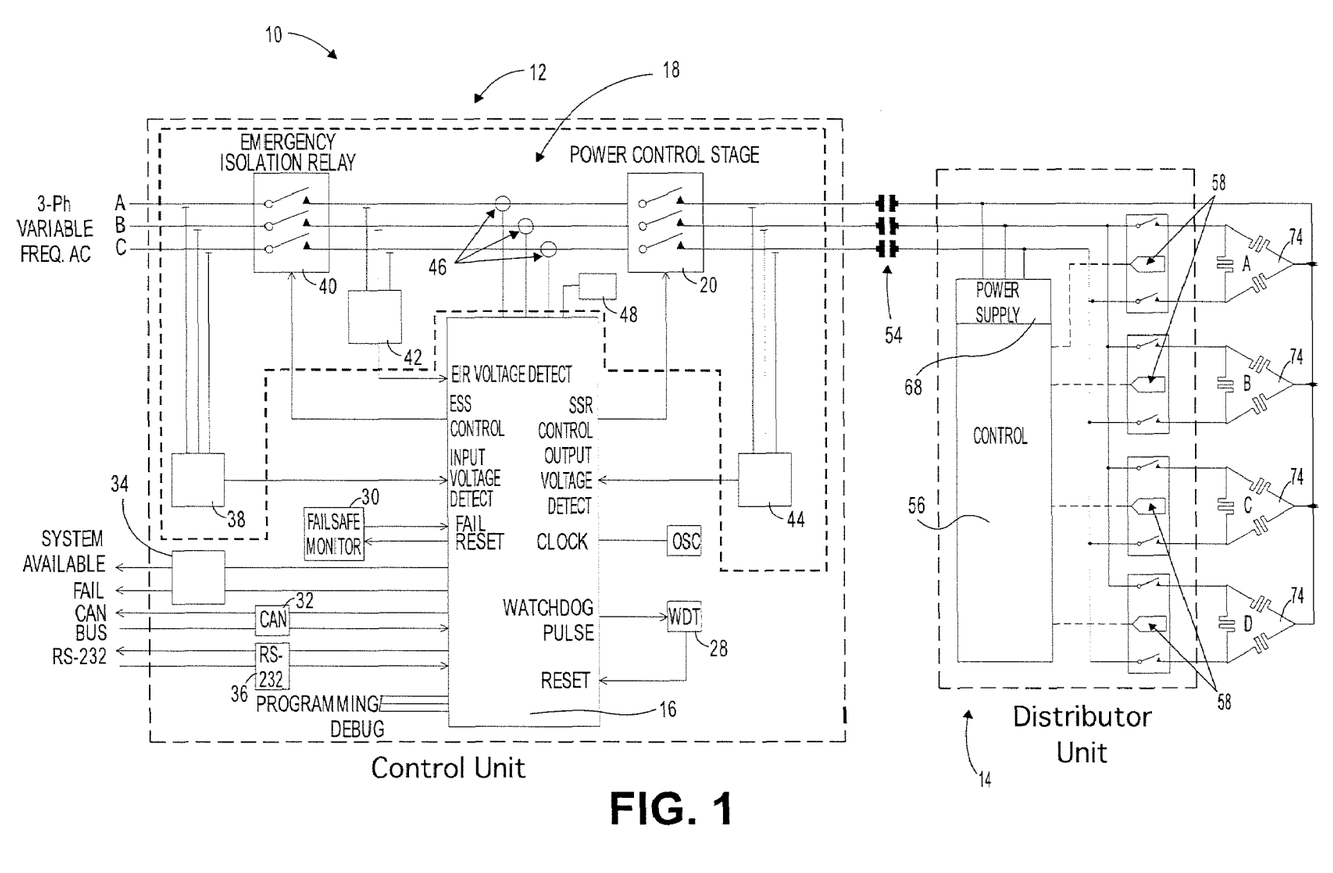
FIG. 1 is a schematic diagram of a system configured in accordance with various embodiments of the present invention.

The control unit 12 is operable to electrically couple with an aircraft power supply to receive power from the aircraft. Preferably, the control unit 12 is operable to receive electric power from the aircraft. The control unit 12 is additionally operable to electrically couple with the aircraft to transmit and receive control signals to enable the aircraft, or its operators, to control and monitor the functionality of the system 10.

The control unit 12 preferably comprises a controller 16 and power conditioning elements 18. The controller 16 and power conditioning elements 18 are generally operable to generate a power signal having a plurality of power transitions. As is discussed in more detail below, the power signal may comprise a three-phase alternating current signal in delta or wye configurations, a one-phase alternating current signal, and/or a direct current signal. The power transitions preferably represent on-off, off-on, on-off-on, off-on-off, etc., transitions within the power signal. However, the power transitions may represent any combination of on and off power transitions are not limited to those articulated above.

For example, in some embodiments where the power signal is an AC signal, the power transitions may comprise on and off periods. Specifically, the power transitions may comprise on and off periods corresponding to one or more cycles of the AC power signal. Thus, the power transitions do not necessarily comprise rapid power transitions.

The controller 16 may comprise various computing devices, microprocessors, microcontrollers, digital signal processors, programmable logic devices, integrated circuits, discrete digital and analog logic elements, combinations thereof, and the like. The controller 16 is also preferably operable to provide fault detection and control of fault related activities, handle communication with the aircraft, and relay diagnostic information. The power conditioning elements 18 may comprise any component or combination of components operable to generate the desired power signal based on instructions from the controller 16 and the power provided by the aircraft.

Further, the controller 16 may be operable to control the various functions of the system 10 according to a computer program, including one or more code segments or other instructions, or with various controller logic and structure.

The computer program may comprise a plurality of code segments arranged as an ordered listing of executable instructions for implementing logical functions in the controller 16. The computer program can be embodied in any computer-readable medium, including a memory, for use by or in connection with an instruction execution system, apparatus, or device, such as a computer-based system, processor-containing system, or other system that can fetch the instructions from the instruction execution system, apparatus, or device, and execute the instructions.

In the context of this application, a "computer-readable medium" can be any means that can contain, store, communicate, propagate or transport the program for use by or in connection with the instruction execution system, apparatus, or device. The computer-readable medium can be, for example, but not limited to, an electronic, magnetic, optical, electro-magnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, a compact disc (CD), a digital video disc (DVD), combinations thereof, and the like. The computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a memory.

Preferably, the power conditioning elements 18 include a power control stage 20 to control the generation of the power signal provided to the distributor unit 14 and to define the plurality of power transitions within the power signal. In some embodiments, the power control stage 20 may comprise one or more conventional relays or switches operable to be functioned by the controller 16 to repeatedly open and close to provide the desired power transitions within the power signal. However, in some embodiments the use of conventional relays and switches may be undesirable due to reliability issues resulting from their frequent functioning, the switching time involved, and/or due to EMI/EMC considerations.

Consequently, the power control stage 20 preferably includes at least one solid-state switching element 22 to form the power signal and associated power transitions. In various embodiments, the solid-state switching element 22 includes at least one silicon-controlled rectifier (SCR) 24 to provide the desired power transitions. The SCR 24, also commonly referred to as a thyristor, is operable to controllably turn on and off to allow the flow of current. Thus, through repeated switching of the SCR 24, and/or other power conditioning elements 18, the system 10 is operable to generate the power signal including the plurality of power transitions.

In some embodiments, the power control stage 20 may include a plurality of SCRs 24. For instance, the power control stage 20 may include a TRIAC to regulate current flow. As is known in the art, a TRIAC (triode for alternating current) presents approximately the same configuration as two SCRs joined in an inverse parallel configuration with their gates connected together.

Figure 5:
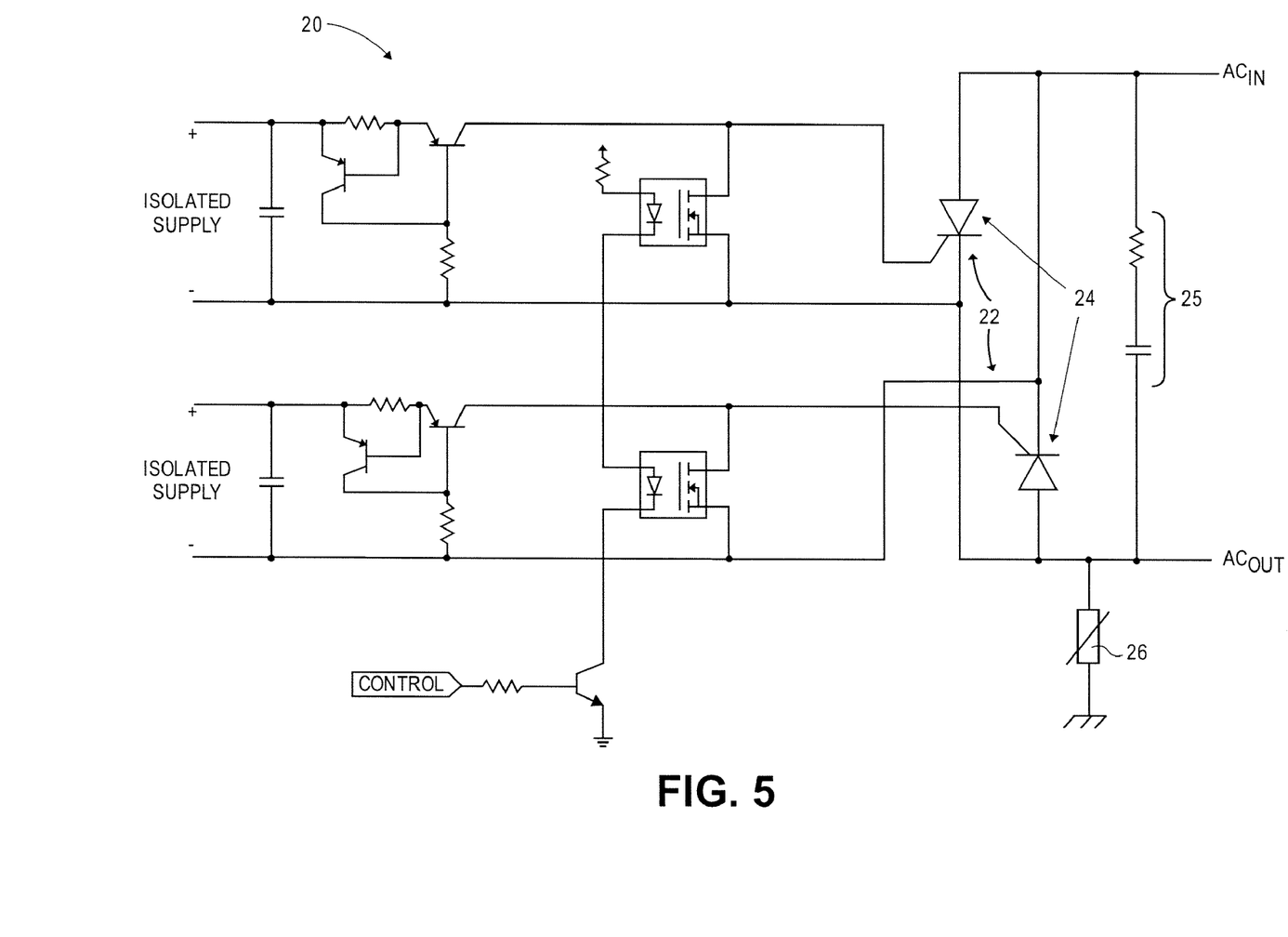
FIG. 5 is a schematic diagram of an exemplary power control stage comprising a portion of the control unit of FIG. 3.

However, due to the high-frequency limitations and voltage sensitivity of TRIACs, it is preferable to configure the SCRs 24 in a back-to-back configuration as shown in FIG. 5. The use of the SCRs 24 instead of TRIACs, alternistors, insulated gate bipolar transistors (IGBT), and other solid-state components is desirable as the use of the SCRs 24 allows for better thermal management, more rugged construction, and higher voltage and current tolerances.

In the back-to-back SCR configuration, each SCR 24 is preferably driven using an isolated constant current gate drive formed from the transistor configuration shown in FIG. 5. The gate drive current is preferably approximately 30 mA to ensure activation under a wide range of conditions, tolerances, and temperatures. When commanded "on", constant current is directed through the SCR 24, the SCR 24 is held "on", and the SCR 24 rapidly conducts for the proper polarity of incoming alternating current signals. If the alternating current signals are of the opposite polarity then the SCR 24 is perched and ready to rapidly conduct when the alternating current polarity changes with no or minimal delay.

To commutate the SCR 24, the constant current is shunted across the gate and cathode through optoisolators to ensure that the SCR 24 will commutate upon the zero current crossing. Further, the general immunity of the SCR 24 to false triggering and noise is greatly enhanced by the fact that the gate and cathode are essentially shorted together when commanded off.

The perched SCR configuration of FIG. 5 desirably allows one of the SCRs 24 to be held on prior to the commutation of the companion SCR 24 and thus the commutating SCR is free to recover as the other SCR is generally instantly ready for conduction. Such a configuration masks the reverse recovery characteristics of the commutating SCR and eliminates the reverse recovery associated radio-frequency noise. Also generally eliminated is the small turn-on conduction angle associated with conventional gate drive configurations in which the gate drive is essentially bootstrapped to the supply, thus requiring a minimum phase voltage to develop before there is sufficient current to trigger the gate.

Preferably, the power control stage 20 includes a snubber 25 placed across each pair of SCRs 24 provided by the power control stage 20. The snubber 25 preferably includes a capacitor and a resistor. The capacitor provides snubbing functionality while the resistor limits the surge current through the capacitor during the transient. The resistor also acts to dampen responses and preferably has a resistance in the range of 1 to 900 ohms. Preferably, the snubber 25 is operable to limit leakage current to less than 3.5 mA at 400 Hz for safety reasons.

The power control stage 20 may also include a transient protection device 26 such as a metal oxide varistor (MOV) or a gas discharge tube (GDT) coupling the output of the SCRs 24 to ground. The use of the transient protection device 26 may be desirable in aircraft environments to provide lighting protection. For example, the transient protection device 26 may be configured to activate at voltages above the normal AC supply but below the maximum withstand voltage of the SCRs 24. Any transients activating the transient protection device 26 would then be shunted to ground.

The SCR 24 configuration shown in FIG. 5 generally implements a solid-state relay (SSR) channel. Preferably, the power control stage 20 includes a SSR channel, and thus two SCRs 24 configured as discussed above, for each phase within the power signal provided to the distributor unit 14. Thus, in embodiments where the control unit 12 provides three-phase power to the distributor unit 14, the power control stage 20 may include three SSR channels, and thus three pairs of SCRs 24 configured as discussed above. However, as should be appreciated, the power control stage 20 may include any number or any configuration of switching elements and is not limited to the back-to-back SCR configuration discussed above.

In embodiments where a delta three-phase arrangement is provided where only two of the three phases require power control, power dissipation in the power control stage 20 can be minimized if control is provided on only two of the three phases. Isolation of the third phase may be ensured when the unit is off or in response to fault conditions.

In some embodiments, the controller 16 additionally includes a watchdog timer 28 and a failsafe monitor 30. The watchdog timer 28 is operable to provide independent status monitoring of the system 10 and control unit 12. For instance, the watchdog timer 28 may be operable to monitor the status of the controller 16 and the integrity of the controller 16 power supply. The watchdog timer 28 is operable to reset the controller 16 should it identify a fault and/or actuate or deactivate various system 10 elements, such as the EIR discussed below, to ensure safe system 10 functionality.

The failsafe monitor 30 is operable to monitor the temperature of the control unit 12 and/or monitor the current provided by the power conditioning elements 18. The failsafe monitor 30 is preferably electrically independent from the controller 16 logic and is operable to function the EIR, discussed below, in response to a detected fault.

The controller 16 also preferably includes an aircraft communication interface 32. The aircraft communication interface 32 enables the control unit 12 to communicate with the aircraft to transmit and receive instructions and information therefrom. The aircraft communication interface 32 may include ARNIC-429, MIL-STD-1553, CAN, and other busses to enable communication with the aircraft. Utilizing the aircraft communication interface 32, the controller 16 may transmit and receive signals and parameters such as operating mode, outside air temperature, airspeed, propeller speed, deicing instructions and control, etc. As should be appreciated, the aircraft communication interface 32 may include any wired or wireless connections for communicating with the aircraft to transmit and receive any signals and information therefrom, and is not necessarily limited to the busses discussed above.

In some embodiments, the controller 16 may also include an input/output interface 34 to receive inputs and provide outputs independent of the aircraft communication interface 32. For example, the input/output interface 34 may be operable to provide backup or redundant communications with the aircraft in the event of the failure of the aircraft communication interface 32.

The controller 16 may also include a maintenance interface 36 to allow direct access to controller information, such as fault logs, to assist in manufacturing and component defect investigations. The maintenance interface 36 is operable for coupling with external diagnostic equipment, such as a personal computer or test jig, using readily accessible protocols such as RS232. The maintenance interface 36 is preferably transparent to the aircraft.

The power conditioning elements 18 may include any element or combination of elements operable to facilitate generation of the power signal and powering of system 10 components including the control unit 12 and distributor unit 14. In some embodiments, the power conditioning elements 18 may include an input voltage monitor 38, an emergency isolation relay (EIR) 40, an EIR voltage monitor 42, a power control voltage monitor 44, current sensing elements 46, and/or a DC power supply 48.

The power conditioning elements 18 are coupled with the aircraft to receive power therefrom. Preferably, the power conditioning elements 18 are coupled with the aircraft to receive three-phase electrical power and DC power therefrom, condition the received power, and form the power signal as discussed herein. However, the power conditioning elements 18 may receive any form of electrical energy from the aircraft for any use by the system 10 and generation of the power signal.

The input voltage monitor 38 is operable to monitor the power provided by the aircraft to the control unit 12. Preferably, the input voltage monitor 38 is operable to monitor the power provided by the aircraft to ensure that the input power is within acceptable limits. The input voltage monitor 38 may be further operable to communicate with the controller 16 to provide status information thereto. Preferably, the input voltage monitor 38 is electrically isolated from the power provided by the aircraft, and thus employs optocouplers, miniature transformers, or other similar devices to monitor input voltages, current, and/or power.

The EIR 40 is preferably coupled with the power control stage 20 to isolate fault conditions. The EIR 40 may be configured to prevent a single power failure from resulting in uncontrolled application of power to the distributor unit 14.

The reliability of the EIR 40 is preferably enhanced by not being integral with the power control stage 20, and thus is not required to switch frequently.

The EIR voltage monitor 42 is operable to monitor the output from the EIR 40 to ensure that all phases are open when the EIR 40 is de-energized and to ensure that all phases are closed when the EIR 40 is energized. The EIR voltage monitor 42 is preferably coupled with the controller 16 to provide status information thereto. Preferably, the EIR voltage monitor 42 is electrically isolated and thus employs optocouplers, miniature transformers, or other similar devices to monitor the outputs of the EIR 40.

The power control voltage monitor 44 is operable to monitor the output of the power control stage 20 to ensure its proper operation. In some embodiments, the power control voltage monitor 44 may be similar in configuration to the EIR voltage monitor 42, discussed above. Preferably, the power control voltage monitor 44 is operable to monitor the output of each solid-state relay channel provided by the power control stage 20. Thus, the power control voltage monitor 44 is preferably operable to detect the failure of any SCRs 24 that comprise the power control stage 20. The power control voltage monitor 44 is preferably isolated in a similar manner to the EIR voltage monitor 42, and thus employs optocouplers, miniature transformers, or other similar devices to monitor the power control stage 20.

The current sensing elements 46 may be integral or discrete with the power control voltage monitor 44 and are operable to sense the current provided by the power control stage 20 to ensure proper output current demand by the distributor, and any loads coupled therewith, and to detect conditions such as overcurrent, undercurrent, and phase imbalance. The current sensing elements 46 may be coupled with the controller 16 to provide status information thereto.

The current sensing elements 46 are preferably electrically isolated and employ current transformers or Hall-effect devices for sensing. However, in some embodiments the current sensing elements 46 may utilize conventional shunts and optocouplers.

In delta-connected embodiments, the current sensing elements 46 preferably monitor current in each of the three phases in order to detect all conditions of overcurrent, undercurrent, and imbalance. However, in wye-connected embodiments it may be desirable to monitor any one phase and neutral, thus employing only two sensing elements.

The DC power supply 48 is operable to provide DC power to various control unit 12 components. The DC power supply 48 is preferably operable to couple with the 28V supply provided by conventional aircraft. In embodiments where DC power is not available from the aircraft, the DC power supply 48 is operable to derive necessary DC power from the alternating current supply provided by the aircraft. Thus, the DC power supply 48 may include step-down transformers and rectifiers to convert AC to DC power. The DC power supply 48 may also include filter and regulation circuitry to ensure that proper power is provided to the control unit 12 components such as the controller 16.

The DC power supply 48 also preferably includes power-retention elements, such as batteries, capacitors, or the like, to allow operation of the controller 16 without interrupt in the event of an AC or DC supply power interruption from the aircraft. In some embodiments, the DC power supply 48 is operable to power various control unit 12 components for at least 200 ms when the AC or DC supply is interrupted.

Figure 3:
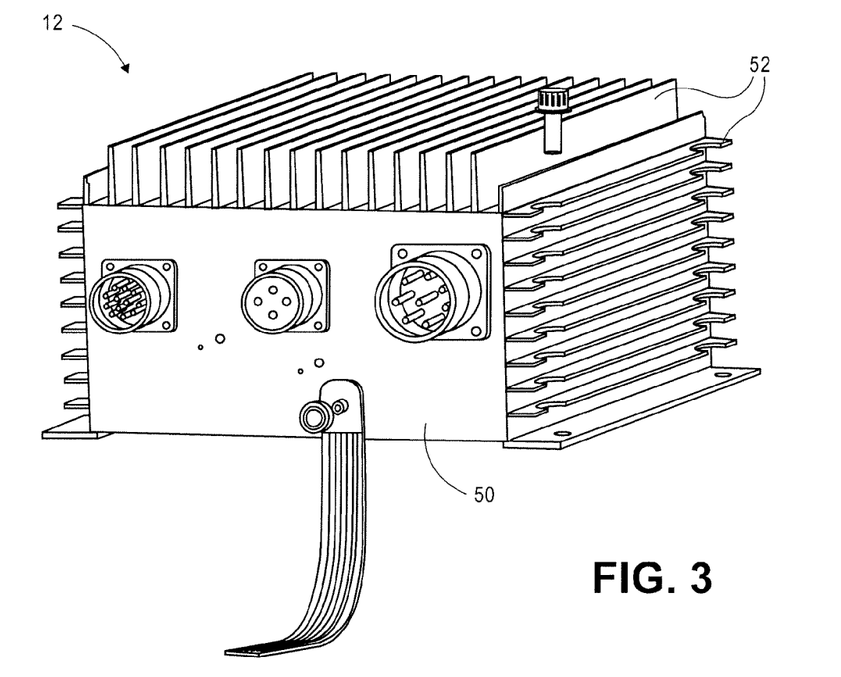
FIG. 3 is a perspective view of a control unit operable to be utilized by various embodiments of the present invention.

The control unit 12 preferably includes a housing 50 for housing various portions of the controller 16 and power conditioning elements 18. The housing 50 may be formed from various materials, including metals and plastics, to house portions of the control unit 12, such as the controller 16 and power conditioning elements 18. As the control unit 12 is mounted on aircraft in various embodiments, and may control up to several kilowatts of power using solid-state techniques, the housing 50 is preferably ruggedly configured for efficient thermal regulation. As forced cooling may be difficult to provide in aircraft environments, it is preferable that the housing 50 is operable to provide appropriate thermal management using convection and radiation. Thus, the housing 50 preferably includes a heatsink and/or plurality of fins 52 operable to dissipate heat generated by the control unit 12.

The distributor unit 14 is rotatably coupled with the control unit 12 through a rotating interface, such as one or more slip rings 54. In various embodiments, the distributor unit 14 is coupled to an aircraft propeller, or other rotating component, to receive power and control from the control unit 12. The distributor unit 14 is generally operable to receive the power signal from the control unit 12, utilize the power transitions within the power signal to identify a control structure, generate a plurality of output signals corresponding to the control structure, and be substantially powered by the power signal. Thus, the power signal provided by the control unit 12 provides both control and power to the distributor unit 14.

The distributor unit 14 preferably includes a distribution controller 56 and a plurality of power control elements 58 coupled with the distribution controller 56. The distribution controller 56 is generally operable to identify power transitions within the power signal and initiate proper switching of the power control elements 58 based on the identified power transitions.

The distribution controller 56 may comprise various computing devices, microprocessors, microcontrollers, digital signal processors, programmable logic devices, integrated circuits, discrete digital and analog logic elements, combinations thereof, and the like. Further, the distribution controller 56 may be operable to control the various functions of the system 10 and/or distributor unit 14 according to a computer program, including one or more code segments or other instructions, or with various controller logic and structure.

Figure 6:
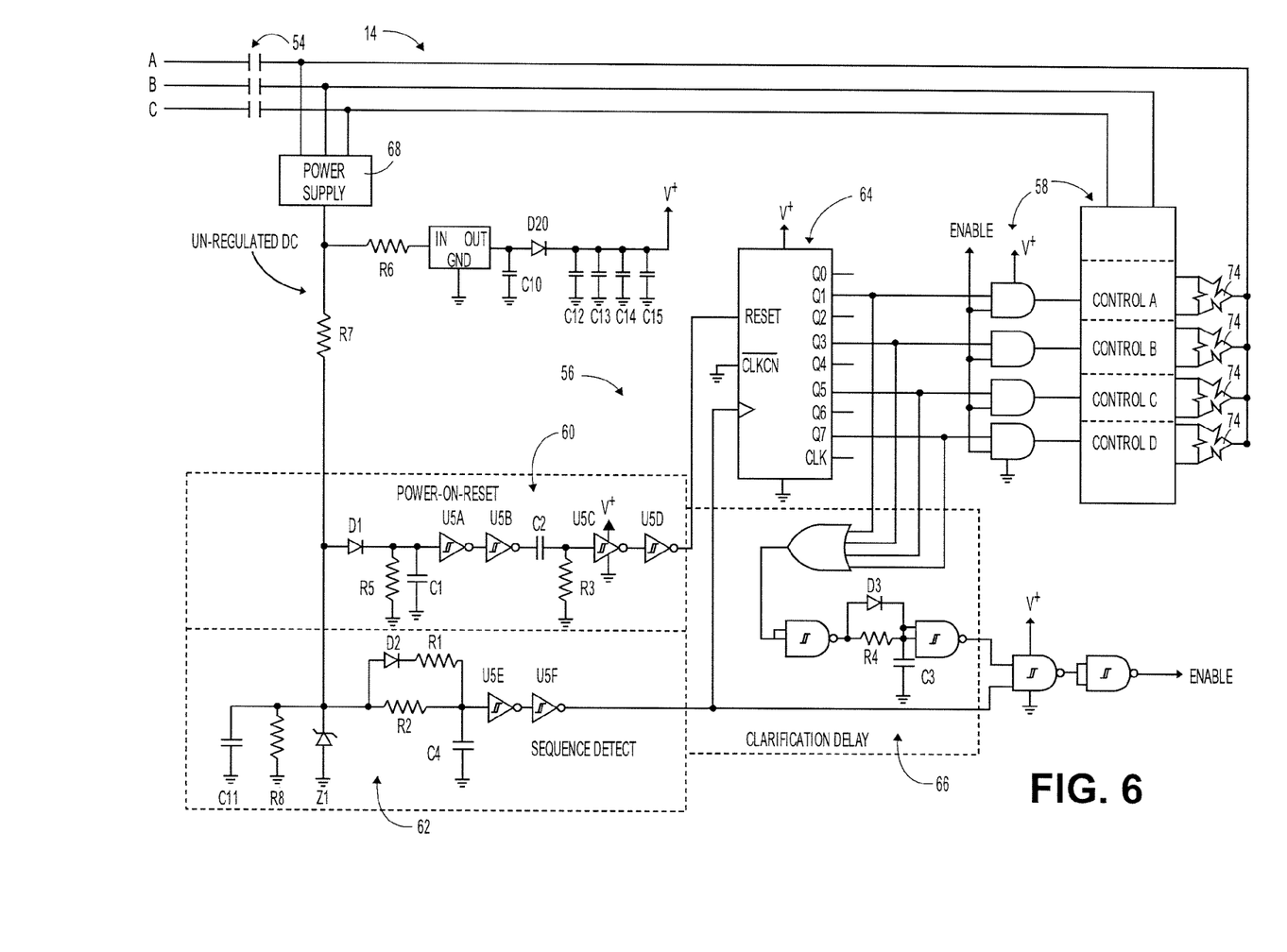
FIG. 6 is a schematic diagram illustrating a circuit comprising a portion of the distributor unit of FIG. 4.

In various embodiments and as shown in FIG. 6, the distribution controller 56 includes power-on-reset circuitry 60, sequence detect circuitry 62, a counter 64, clarification delay circuitry 66, and a power supply 68. However, the distribution controller 56 may include any element or combination of elements operable to be powered by the power signal and control the power control elements 58 to provide a plurality of output signals corresponding to the power transitions within the power signal.

The power supply 68 is operable to receive the power signal from the control unit 12 to condition the power signal for use by other distribution controller 56 elements. For instance, in embodiments where the power signal is a three-phase AC signal, the power supply 68 is operable to transform the three-phase AC signal into a DC signal for use by the other distribution controller 56 elements. Thus, in some embodiments the power supply 68 may be similar to the DC power supply 48 utilized by the control unit 12. The power supply 68 may also include filtering and regulation elements to filter and regulate the provided DC signal. Preferably, the power supply 68 also includes power-retention elements, such as batteries or capacitors, to enable temporary operation of the distribution controller 56 should the power signal be interrupted.

The sequence detect circuitry 62 is operable to identify the power transitions within the power signal and provide debouncing and filtering to enable distinction between normal power interruptions and the power transitions. The sequence detect circuitry 62 is preferably coupled with the power supply 68 and operable to generate a clock signal for cycling the counter 64. For instance, for each on-off, off-on, on-off-on, off-on-off, etc., power transition within the power signal, the sequence detect circuitry 62 may be operable to generate a clock signal to cycle the counter 64 to the next state. The sequence detect circuitry 62 may include any circuitry operable to identify the power transitions within the power signal and provide a corresponding output for use by the counter 64 or other system 10 elements. Thus, the sequence detect circuitry 62 is not limited to the configuration illustrated in FIG. 6.

For example, in some embodiments where the power signal is an AC signal, the sequence detect circuitry 62 may be operable to detect on and off cycles and periods within the AC signal. Specifically, the sequence detect circuitry 62 may be configured to identify the number of AC cycles the power signal is off and instruct the counter 64 to cycle appropriately. For instance, the sequence detect circuitry 62 may identify an off period corresponding to one AC cycle and generate a signal to cause the counter 64 to cycle one state, identify an off period corresponding to two AC cycles and generate a signal to cause the counter 64 to cycle two states, etc.

In various embodiments, the sequence detect circuitry 62 is operable to utilize a time constant, where power transitions within the power signal having durations less than the time constant are ignored by the sequence detect circuitry 62 and do not result in a clock signal transition. For instance, in embodiments where the time constant is 200 ms, the sequence detect circuitry 62 is operable to ignore on-off-on power signal transitions lasting less than 200 ms while on-off-on transitions lasting between 200 ms and 250 ms may cause a transition in the clock signal to cycle the counter 64. As should be appreciated, any time constant may be employed by the sequence detect circuitry 62 to enable proper identification of power transitions.

The sequence detect circuitry 62 may be integral with the counter 64 in some embodiments and/or comprise any circuit element or combination of circuit elements, including the various components illustrated in FIG. 6. In the embodiment shown in FIG. 6, the D2/R1 path is operable to rapidly charge capacitor C4, while the R1/C4 combination provides filtering against rapid spikes and transients. The output of the D2/R1 and R2 paths is buffered to feed the clock input of the counter 64. When the power signal ceases, capacitor C4 is discharged through R2 and R8.

The counter 64 is preferably a divide-by-n counter operable to provide a plurality of control output signals corresponding to the clock signal provided by the sequence detect circuitry 62. In some embodiments, the counter 64 may provide the plurality of control output signals by directly identifying the power transitions within the power signal. Each control output signal may correspond to the output signals provided by the distributor unit 14, such that for each output signal the counter 64 provides a control output signal. However, as shown in FIG. 6, the control output signals do not necessarily correspond to each output signal as the counter 64 may provide a plurality of dwell states that do not correspond to the generation of output signals.

While the counter 64 is one element operable to facilitate generation of the desired output signals based on the power transitions within the power signal, it should be appreciated that other logic and elements may be utilized to effect a change in the output signals. For example, in some embodiments a state machine may be employed to jump to any state based on the identified power transitions. Similarly, the counter 64 may be configured to non-sequentially cycle through the states based on the identified power transitions.

In embodiments where the distributor unit 14 provides four output signals, the counter 64 may provide eight states operable to cycled through according to the power transitions within the power signal, as identified by the sequence detect circuitry 62. In such embodiments where the number of counter 64 outputs is twice the number of distributor unit 14 output signals, every other counter 64 state is preferably a dwell state that is not utilized by other system 10 components.

The power-on-reset circuitry 60 generally ensures that the sequencing provided by the counter 64 conforms to a predetermined pattern always starting with the same initial output. Specifically, the power-on-reset circuitry 60 is operable to identify power transitions, such as on-off-on transitions, within the power signal exceeding a predetermined threshold and reset the counter 64 accordingly. For example, in some embodiments the power-on-reset circuitry 60 is operable to identify on-off-on transitions within the power signal that exceed 250 ms and provide a reset signal to the counter 64, as shown in FIG. 6, such that the counter 64 will revert to its lowest state.

The power-on-reset circuitry 60 may include any circuit element or elements operable to provide the reset functionality discussed above. In the embodiment of FIG. 6, the input to U5A is held low by R5 and the input to U5C is held low by R3 when no power is applied by the power signal. When the power signal first applies power, the input of U5A sees a nearly instantaneous logic high as capacitor C1 is charged through diode D1. The nearly instantaneous logic high produces a brief pulse, determined by the C2/R3 time constant, which is buffered through the reset input of the counter 64. When the power signal ceases, the input to U5A is held in place by C1 but is discharged through R5. The R5/C1 value is preferably chosen to correspond to a desired duration of a legitimate loss of power, such as the 250 ms threshold discussed above. If the power signal resumes before C1 discharges then the counter 64 is not reset but if the power signal resumes after C1 discharges, the counter 64 is reset to ensure proper operation of the distributor unit 14.

The clarification delay circuitry 66 is coupled with the counter 64 and delays the control output signals to ensure that they are consistent with the power transitions provided by the control unit 12. In particular, the clarification delay circuitry 66 provides a clarification delay to at least some of the control output signals before they are provided to the power control elements 58, thereby ensuring that the control output signals appropriately correspond to the power transitions within the power signal provided by the control unit 12.

For example, if the power signal includes a fault or a power transition indicating that a particular control output signal should be skipped, the clarification delay circuitry 66 is operable to delay propagation of the control output signals until the sequence detect circuitry 62 and controller 64 provide appropriate outputs. Thus, the clarification delay circuitry 66 enables the distributor unit 14 to provide the output signals in any order even when a sequential counter is employed.

The clarification delay circuitry 66 may include any circuit element or combination of circuit elements operable to delay the control output signals provided by the counter 64. For example, in the embodiment of FIG. 6, the OR gates detect when a control output signal has been provided and the R4/C3 combination provides the clarification delay time to inhibit the application of power by providing an enable signal to the power control elements 58.

The power control elements 58 are coupled with the distribution controller 56 to receive the control output signals therefrom and with the slip rings 54 to receive the power signal therefrom. Utilizing the control output signals, the power control elements 58 provide the desired output signals by switching according to the power transitions within the power signal provided by the control unit 12.

The power control elements 58 are preferably coupled with the clarification delay circuitry 66 to receive the enable signal therefrom and provide the output signals only when the enable signal is enabled, e.g. when the enable signal corresponds to a logic high. For instance, as shown in FIG. 6, the power control elements 58 may include a plurality of AND gates, coupled with at least some of the control output signals and the enable signal, such that the power control elements 58 provide the desired output signals only when the enable input is high. However, as should be appreciated, any electrical elements may be used to disable and enable the power control elements 58 and the power control elements 58 do not necessarily utilize the enable signal in all embodiments.

Figure 7:
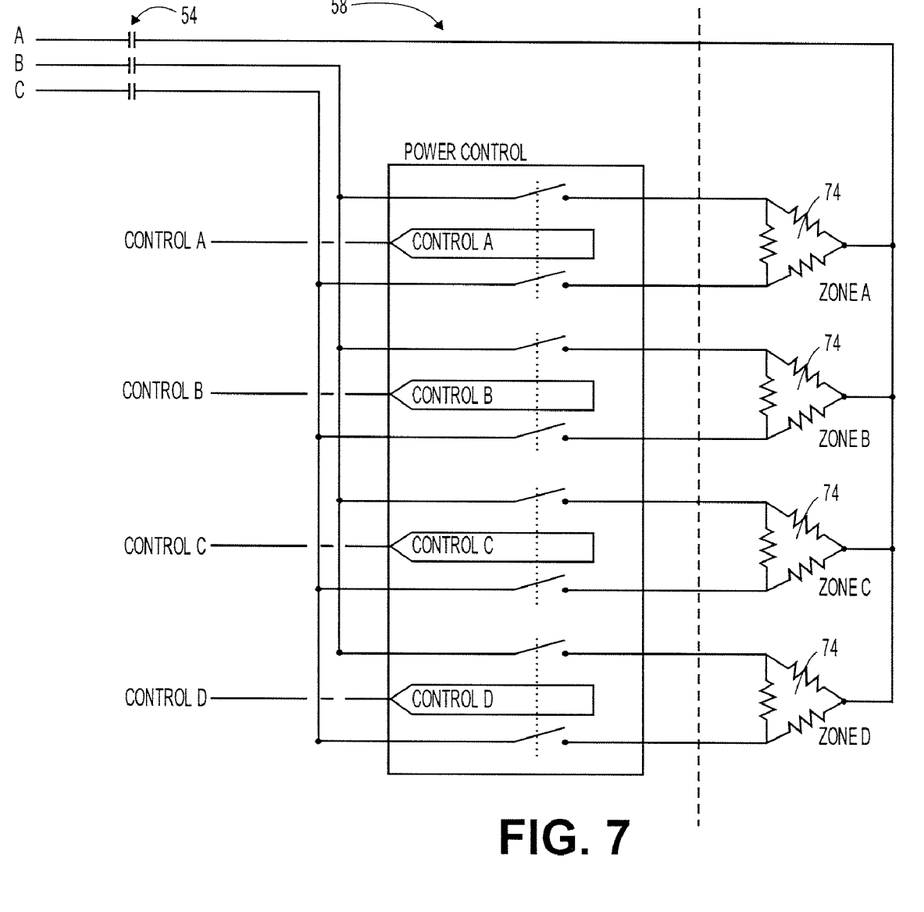
FIG. 7 is a schematic diagram of power control elements that comprise a portion of the circuit of FIG. 6
Figure 8:
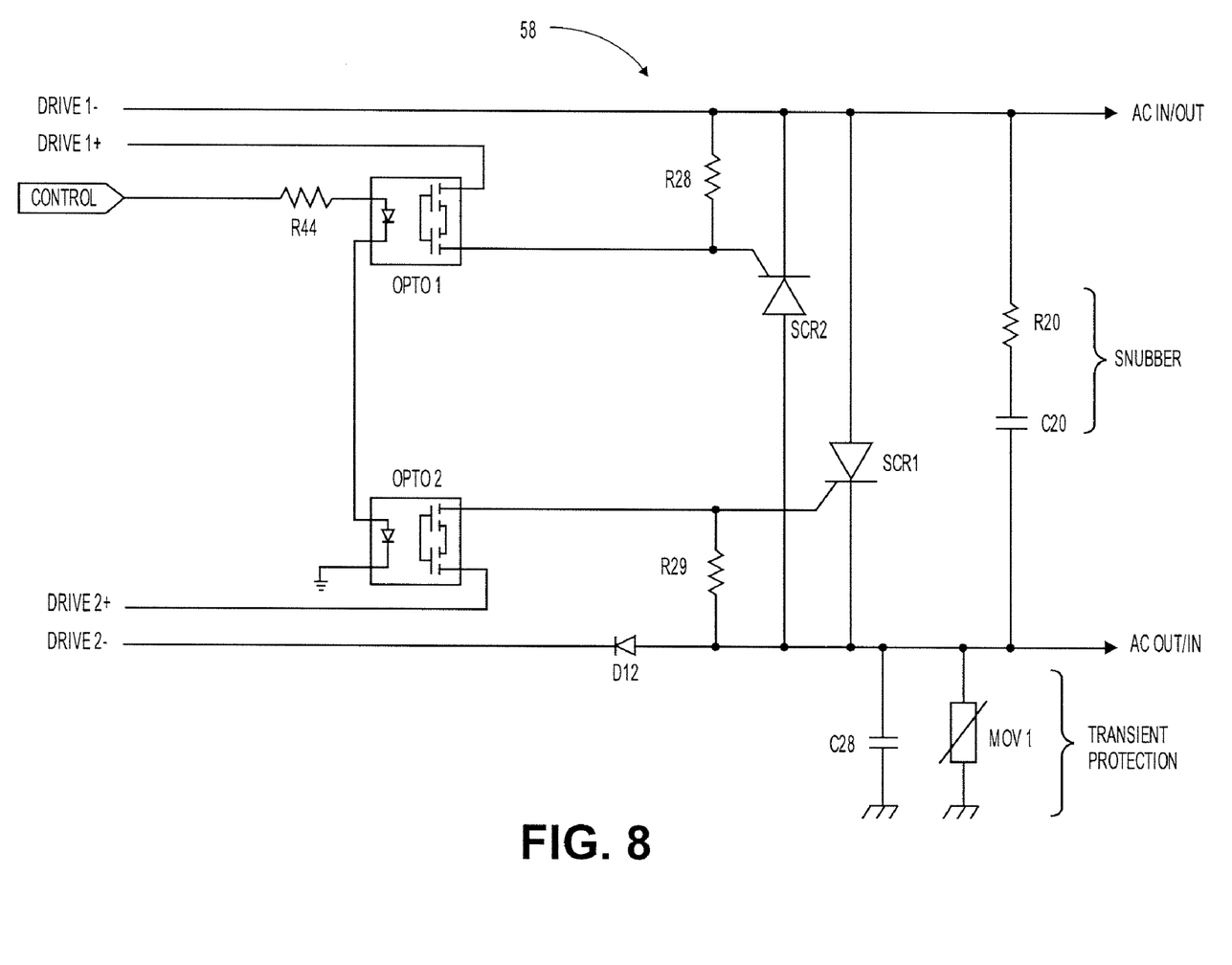
FIG. 8 is a schematic diagram of the circuit of FIGS. 6-7 showing portions of the power control elements in more detail.

Various embodiments of the power control elements 58 are shown in detail in FIGS. 7 and 8. Some of the power control elements 58 may be similar or identical to the power control stage 20 provided by the control unit 12. Specifically, the power control elements 58 may include a back-to-back SCR configuration for each phase of the power signal, as shown in FIG. 8, to appropriately switch the power signal to provide the desired output signals according to the control output signals provided by the counter 64. However, the power control elements 58 may include any switching elements, such as relays or the like, operable to switch or control the power signal according to the control output signals provided by counter 64, and are not limited to the SCR configuration discussed above.

Figure 4:
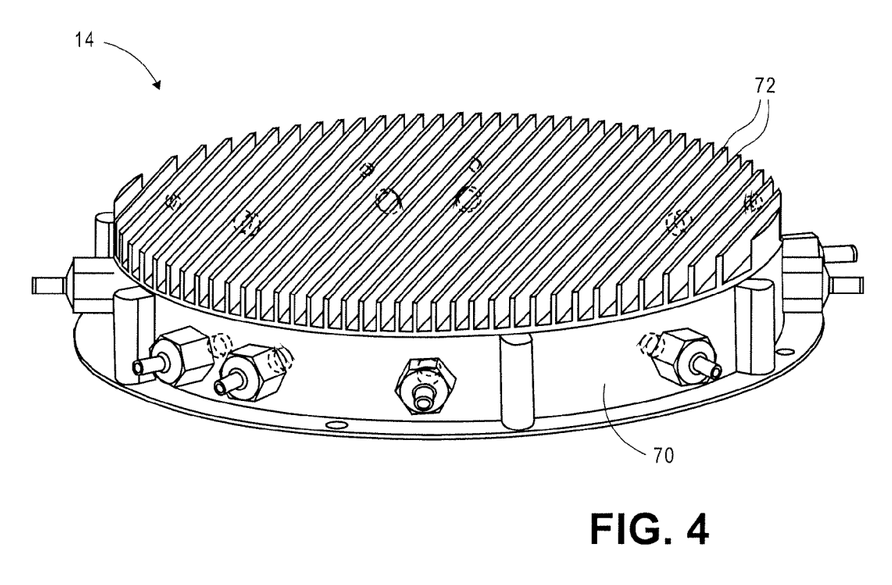
FIG. 4 is a perspective view of a distributor unit operable to be utilized by various embodiments of the present invention.

The distributor unit 14 preferably includes a housing 70 for housing various portions of the distribution controller 56 and power control elements 58. The housing 70 may be formed from various materials, including metals and plastics. As the distributor unit 14 is mounted on aircraft in various embodiments, and may control up to several kilowatts of power using solid-state techniques, the housing 70 is preferably ruggedly configured for efficient thermal regulation. As forced cooling may be difficult to provide in aircraft environments, it is preferable that the housing 70 is operable to provide appropriate thermal management using convection and radiation. Thus, the housing 70 preferably includes a heatsink and/or plurality of fins 72 operable to dissipate heat generated by the distributor unit 14.

Further, as the distributor unit 14 is preferably configured for mounting to a rotating element, such as an aircraft propeller, the various distributor unit 14 components are preferably potted within the housing 70 to provide protection from high G forces. Further, the various distributor unit 14 components are preferably balanced within the housing 70 so as to not interfere with rotation of the rotating element.

Figure 12:
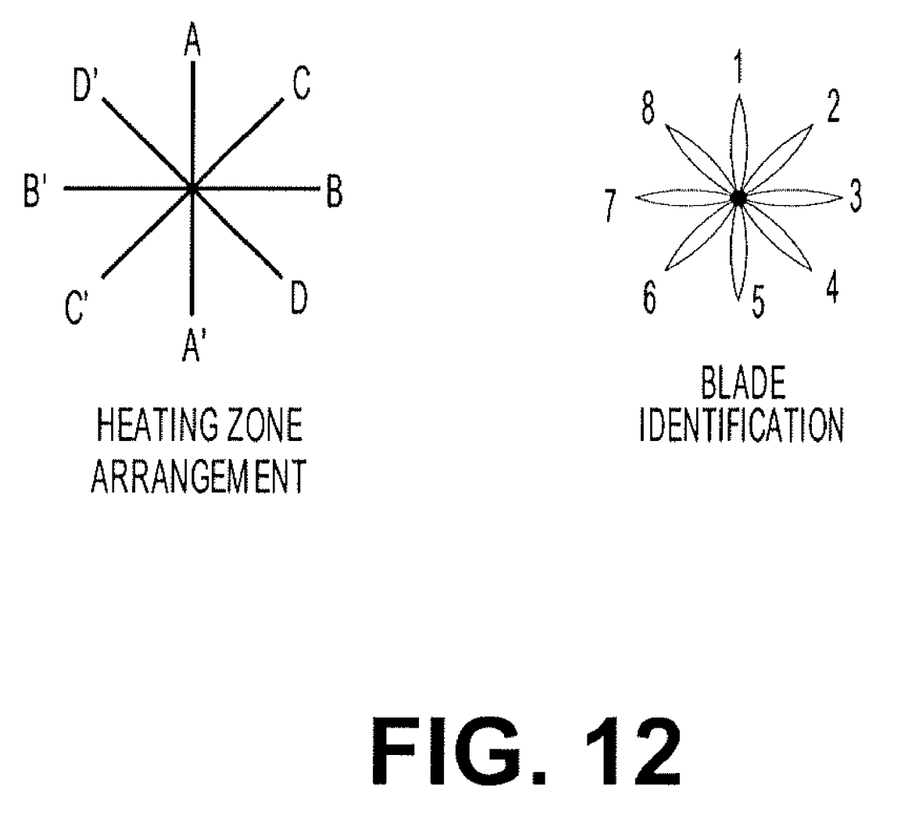
FIG. 12 is a diagram illustrating various propeller regions and corresponding heating zones.

The distributor unit 14 may be coupled with a plurality of load devices to provide electrical power thereto according to the power transitions provided by the power signal. In some embodiments the distributor unit 14 may be coupled with a plurality of deicing zones 74 each corresponding to one or more deicing elements. For example, as shown in FIG. 12, each blade on an aircraft propeller may correspond to a heating zone or a portion of a heating zone, to enable the blades to be desirably deiced or heated separately. Thus, the output signals provided by the distributor unit 14 may be provided to the zones 74 to power one or more corresponding deicing elements.

In operation, the control unit 12 is coupled with one end of a rotating interface and the distributor unit 14 is coupled with the other end of the rotating interface and configured to receive the power signal from the control unit 12. The control unit 12 provides the power signal, with the plurality of power transitions therein, to both power the distributor unit 14 and cause the distributor unit 14 to generate the output signals in a desired manner.

In various embodiments, the power transitions within the power signal define a control structure for the output signals generated by the distributor unit 14. The distributor unit 14 is operable to identify the transitions within the power signal, form the control structure based on the identified power transitions, and generate the output signals accordingly. For example, if the distributor unit 14 is operable to provide four outputs, the control unit 12 may form the power signal and power transitions to represent a particular control structure, such as an output sequence or output combination, and the distributor unit 14 may identify the power transitions to form the control structure and generate the appropriate output sequence or combination.

Thus, by including on-off transitions, off-on transitions, on-off-on transitions, off-on-off transitions, combinations thereof, and the like, within the power signal, the control unit 12 is operable to dictate the control structure for the output signals generated by the distributor unit 14. The control unit 12 and distributor unit 14 may employ any signaling method using power transitions to identify and form the control structure.

The control structure may correspond to a load sequence for a plurality of load devices, such as deicing zones 74 or deicing elements, coupled with the distributor unit 14. For example, the control structure may dictate the sequence in which the load devices are powered, the combination of load devices which are utilized, the duration each load device is powered, combinations thereof, and the like.

Preferably, the control structure formed by the distributor unit 14 utilizing the power transitions corresponds to the various states provided by the counter 64. Thus, for example, the sequence detect circuitry 62 may identify a power transition within the power signal and instruct the counter 64 to cycle to the next state. In embodiments where the counter 64 is operable to cycle through eight states, the sequence detect circuitry 62 may identify a power transition, or a combination of power transitions, to cycle through each of the eight states.

In such embodiments, the counter 64 is operable to provide eight control output signals corresponding to eight states, and the power control elements 58 are operable to provide four output signals using the eight control output signals. For example, the eight states provided by the counter 64 may correspond (in order) to: dwell, a first output signal, dwell, a second output signal, dwell, a third output signal, dwell, and a fourth output signal. Utilizing the power transitions, the distributor unit 14 is operable to cycle through each of these states to provide the desired output signals. As discussed above, the power-on-reset circuitry 60 is operable to reset the counter 64 to the first state should certain conditions be satisfied.

In various embodiments, the system 10 utilizes on-off-on power transitions to cycle through the various states provided by the counter 64. For instance, for each on-off-on power transition within the power signal, the counter 64 may cycle to the next state thereby causing the distributor unit 14 to output a different output signal, a different combination of output signals, or no output at all.

Preferably, the counter 64 cycles to the next state only if the identified on-off-on transition has a duration within a predetermined range. For instance, as discussed above, the sequence detect circuitry 62 may employ a time constant, such as 200 ms, such that on-off-on transitions lasting between 200 ms and 250 ms cause the counter 64 to cycle to the next state while on-off-on transitions having other durations do not cause the counter 64 to cycle to the next state. Once the counter 64 cycles to a new state in response to a power transition, the counter 64 may stay in the new state, such that the distributor unit 14 outputs the same output signal for any period of time. As should be appreciated, in embodiments where the distributor unit 14 is coupled with the deicing zones 74, it may be desirable to limit state duration for temperature control scheduling purposes. Upon detection of the next on-off-on transition having a duration within the predetermined range, the counter 64 may cycle to the next state.

As discussed above, on-off-on transitions having durations less than the time constant, such as less than 200 ms, are preferably ignored by the distributor unit 14 to prevent temporary interruptions in the power signal from interfering with the generation of output signals. As is also discussed above, on-off-on transitions having durations greater than the predetermined range, such as 250 ms, are preferably identified by the power-on-reset circuitry 60 to reset the counter 64.

In some situations, such as where a particular deicing zone fails, it may be desirable to skip over a faulty zone by not providing an output signal corresponding to the zone, while still maintaining the control structure associated with the overall sequence provided by the power signal. To provide such functionality, the system preferably utilizes the clarification delay discussed above regarding the clarification delay circuitry 66. In particular, the distributor unit 14 provides the clarification delay, where the output signal is inhibited for duration of the clarification delay after the counter 64 has cycled to the next state. Thus, at any time during the clarification delay, an on-off-on sequence may be initiated to cycle the counter 64 to avoid generation of a particular output signal. Further, should fault detection devices and monitors included within the control unit 12 activate, the control unit 12 can generate another on-off-on transition within the clarification delay period to prevent the generation of a particular output signal.

Figure 2:
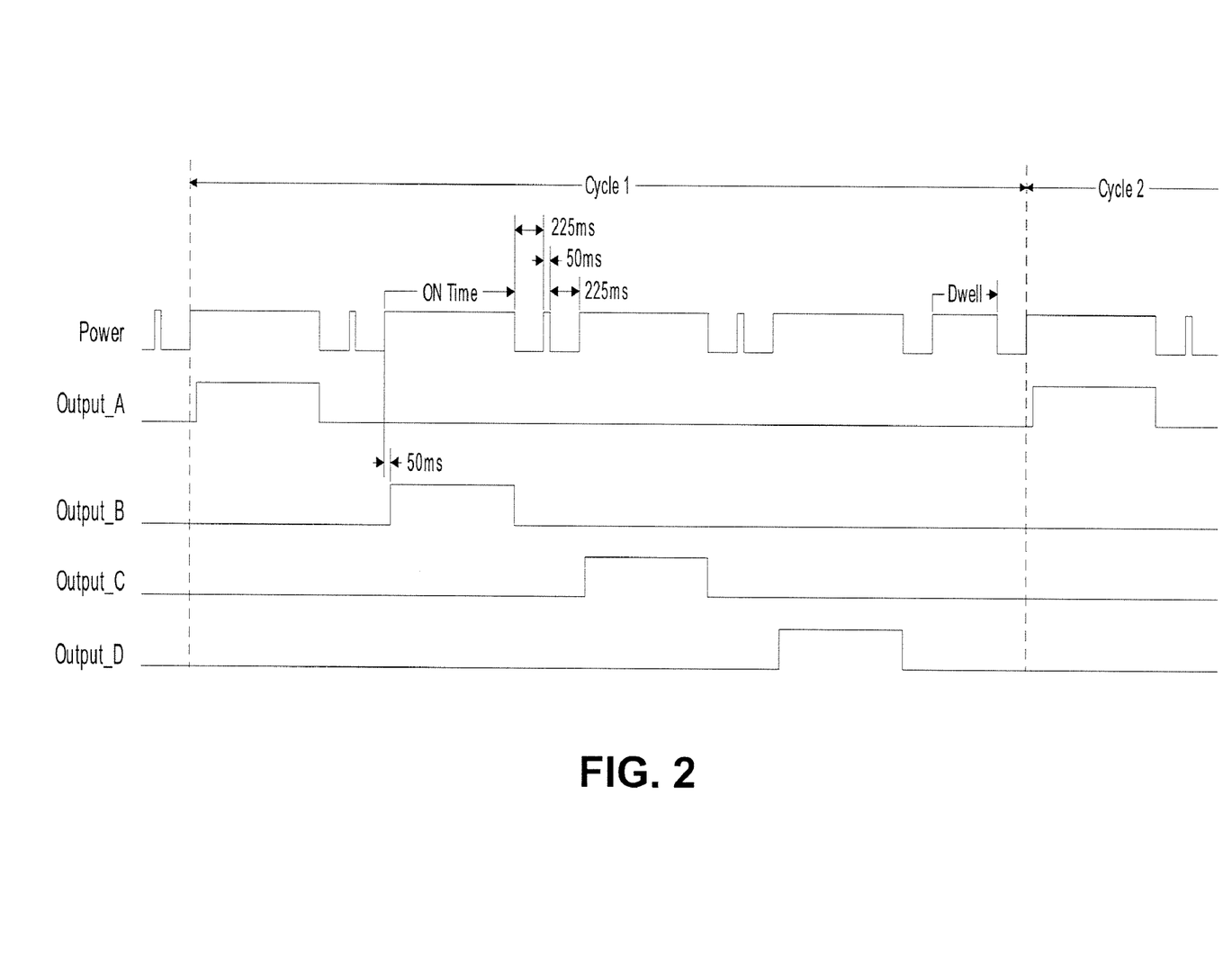
FIG. 2 is an exemplary timing diagram corresponding to the system of FIG. 1.

As shown in FIG. 2, the duration of the last dwell in the cycle of states provided by the counter 64 is preferably equal to the remainder of time in the cycle period. Varying the duration of the last dwell in a cycle allows the distributor unit 14 to provide consistent cycle timing even if one or more states are skipped due to faults or other conditions.

As should be appreciated, the system 10 may employ any control method utilizing power transitions within the power signal and is not limited to the on-off-on transition methods discussed above. Further, the power transition methods employed by the system 10 may be modified without altering the physical components of the system 10, such that different control structures and output signals may be provided without requiring replacement of the system 10.

Although the invention has been described with reference to the preferred embodiment illustrated in the attached drawing figures, it is noted that equivalents may be employed and substitutions made herein without departing from the scope of the invention as recited in the claims.

Figure 9:
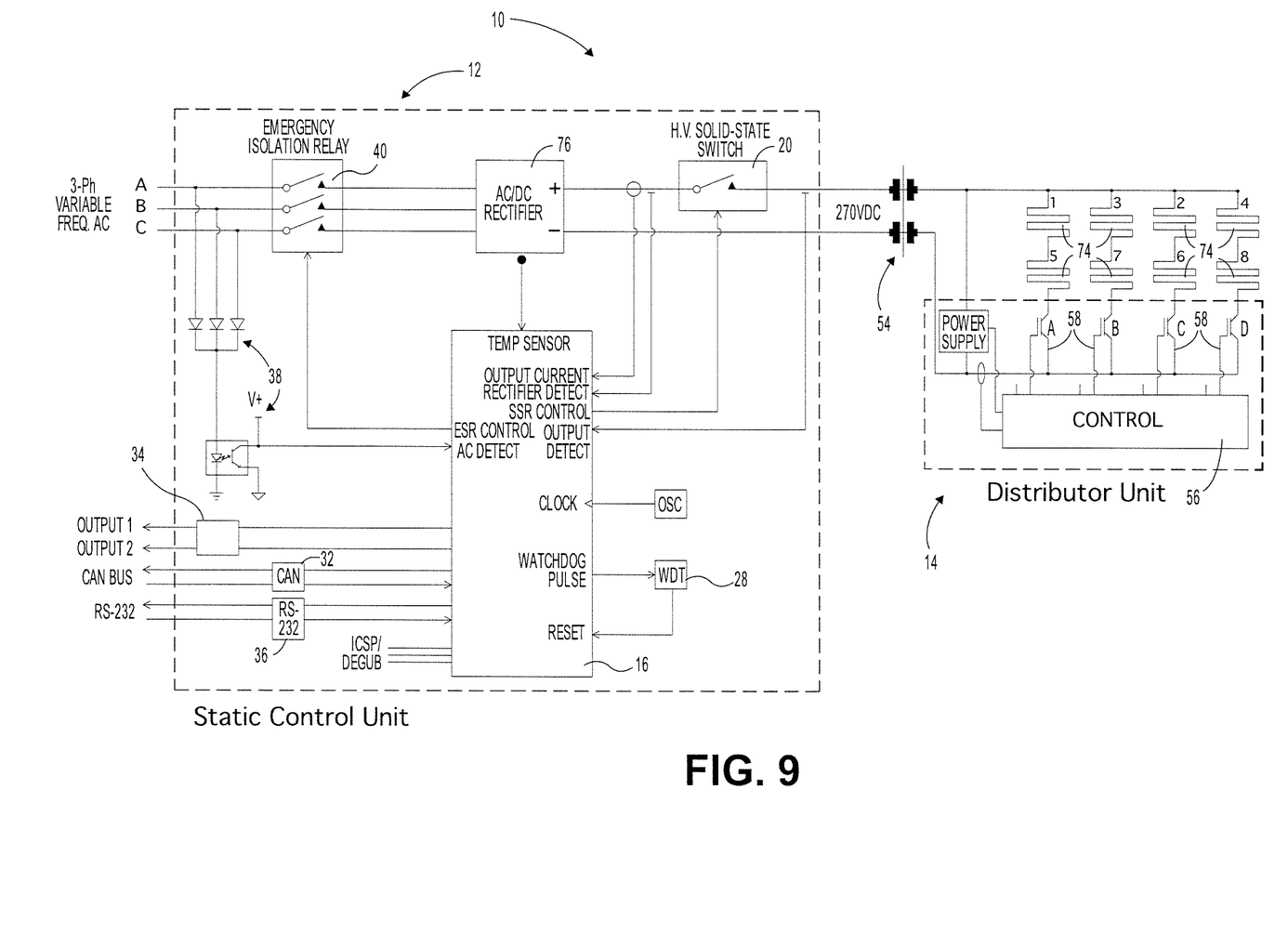
FIG. 9 is a schematic diagram of a system configured in accordance with various other embodiments of the present invention.

For example, as shown in FIG. 9, in various embodiments the control unit 12 may provide DC power to the distributor unit 14 through the rotating interface instead of three-phase or one-phase AC power. In such embodiments, two slip-rings may be employed as the rotating interface instead of the three-slip rings required for three-phase AC power. To provide DC power to the distributor unit 14, the control unit 12 preferably includes an AC/DC converter to convert AC power provided by external sources, such as the aircraft, to DC power for use by the distributor unit 14.

Figure 10:
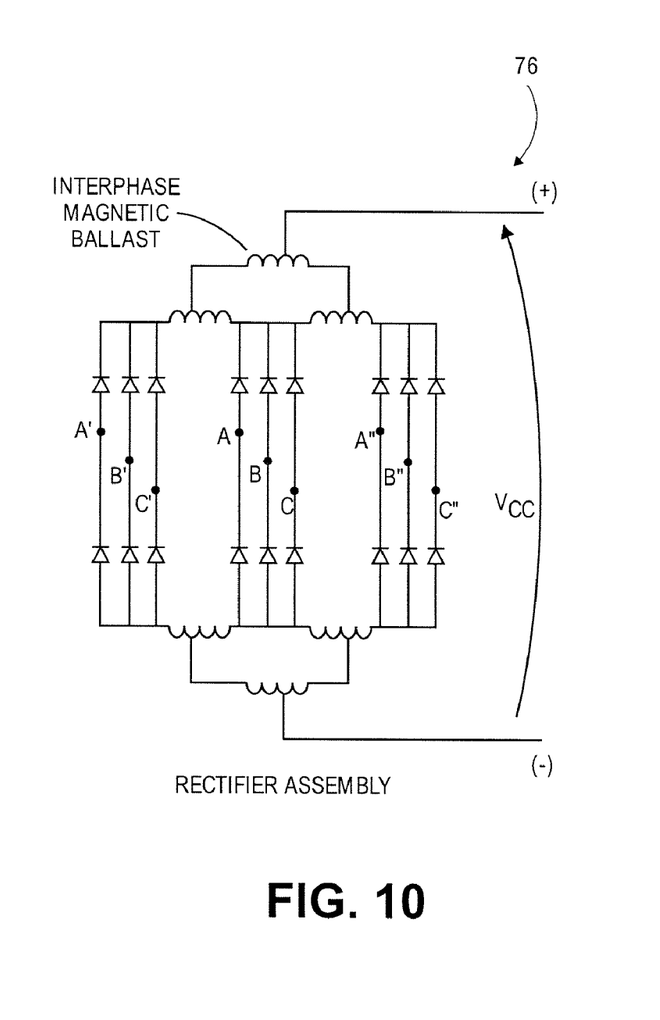
FIG. 10 is a schematic diagram of a rectifier assembly operable to be utilized by various embodiments of the system of FIG. 9.
Figure 11:
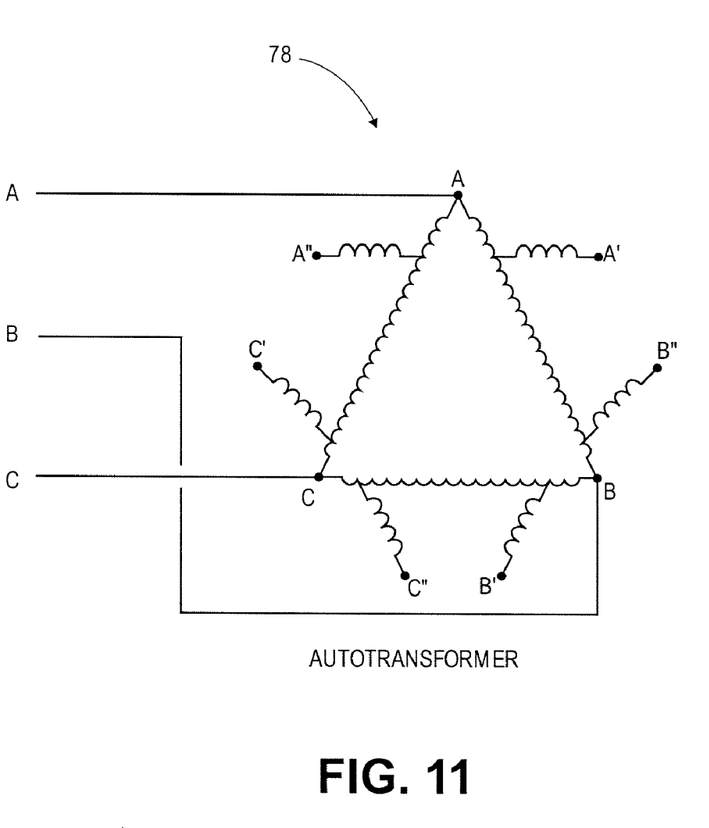
FIG. 11 is a schematic diagram of an autotransformer operable to be utilized by various embodiments of the system of FIG. 9.

For example, the control unit 12 may include a six-pulse rectifier to convert AC to DC power. However, such a configuration may be undesirable due to the harmonics produced from the configuration, which may exceed industry standards and manufacturing requirements. Thus, as shown in FIGS. 9 and 10, a multiphase transformer rectifier 76 is preferably utilized to convert three-phase AC power, provided by the aircraft, into DC power for use by the distributor unit 14. The multiphase transformer rectifier 76 complies with required harmonic, power factor, and emission requirements and is preferably capable of operating from a variable frequency supply. In situations where isolation is not required, an autotransformer 78 may be employed as it provides the lowest weight of AC/DC converter implementations. Alternatively, active power factor correction (PFC) circuitry may be utilized in connection with a rectifier to convert three-phase AC power to DC in a manner that complies with harmonic and power factor requirements.

Having thus described the preferred embodiment of the invention, what is claimed as new and desired to be protected by Letters Patent includes the following:

1. A system comprising:
   a control unit operable to generate a power signal having a plurality of power transitions; and
   a distributor unit operable to—
   rotatably couple with the control unit,
   receive the power signal from the control unit,
   identify power transitions and their durations within the power signal,
   generate a plurality of output signals corresponding to the identified power transitions utilizing power at least substantially provided by the power signal,
   deactivate all outputs after power transitions are identified within the power signal, and
   control the output utilizing both the identified power transitions and their durations.

2. The system of claim 1, wherein the power signal is selected from the group consisting of a poly-phase alternating current signal, a one-phase alternating current signal, and a direct current signal.

3. The system of claim 1, wherein the output signals are selected from the group consisting of poly-phase alternating current signals, one-phase alternating current signals, and direct current signals.

4. The system of claim 1, wherein the distributor unit is operable to—
   utilize the power transitions within the power signal to form a control structure, and
   generate the plurality of output signals corresponding to the control structure.

5. The system of claim 4, wherein the power transitions include on-off-on transitions and the distributor unit is operable to identify the on-off-on transitions to form the control structure.

6. The system of claim 4, wherein—
   the distributor unit is operable to couple with a plurality of load devices,
   the control structure corresponds to a load sequence for the load devices,
   the output signals are operable to power the load devices,
   the load sequence comprises a plurality of states, and
   the distributor is operable to identify the power transitions within the power signal to cycle through the plurality of states to control powering of the load devices.

7. The system of claim 6, wherein the load devices include a plurality of deicing elements.

8. The system of claim 6, wherein the distributor unit is operable to identify the duration of an on-off-on power transition within the power signal and cycle through at least one of the states when the duration of the on-off-on power transition is within a predetermined range.

9. The system of claim 8, wherein the predetermined range is approximately between 200 milliseconds and 250 milliseconds.

10. The system of claim 8, wherein on-off-on power transitions having durations less than the predetermined range are not used by the distributor unit to cycle through the states.

11. The system of claim 1, wherein the distributor unit is operable to couple to the control unit using at least one slip ring.

12. The system of claim 1, wherein the control unit is operable to mount to an aircraft and the distributor is operable to mount to an aircraft propeller to power a plurality of propeller deicing elements.

13. The system of claim 12, wherein the control unit is operable to receive an alternating current signal from the aircraft and the control unit includes an autotransformer to convert at least a portion of the alternating current signal to a direct current signal.

14. The system of claim 1, wherein the distributor unit is further operable to identify the duration of the power transitions within the power signal and generate the output signals utilizing both the identified power transitions and their durations.

15. The system of claim 1, wherein the control unit includes at least two silicon-controlled rectifiers arranged in a perched configuration to facilitate generation of the power transitions within the power signal.

16. A method of providing power and control through a rotating interface, the method comprising:

generating a power signal having a plurality of power transitions;

transmitting the power signal from a first end of the rotating interface; receiving the power signal at a second end of the rotating interface;

identifying the power transitions and their durations within the power signal, generating a plurality of output signals corresponding to the identified power transitions utilizing power at least substantially provided by the power signal, deactivating all outputs after power transitions are identified within the power signal, and controlling the output utilizing both the identified power transitions and their durations.

17. The method of claim 16, wherein the power signal is selected from the group consisting of a poly-phase alternating current signal, a one-phase alternating current signal, and a direct current signal.

18. The method of claim 16, wherein the output signals are selected from the group consisting of poly-phase alternating current signals, single-phase alternating current signals, and direct current signals.

19. The method of claim 16, further including— utilizing the power transitions within the power signal to form a control structure, and generating the plurality of output signals corresponding to the control structure.

20. The method of claim 19, wherein the power transitions include on-off-on transitions and the method further includes identifying the on-off-on transitions to form the control structure.

21. The method of claim 19, further including identifying the power transitions within the power signal to cycle through a plurality of load sequence states to control powering of a plurality of load devices.

22. The method of claim 21, further including identifying the duration of an on-off-on power transition within the power signal and cycling through at least one of the states when the duration of the on-off-on power transition is within a predetermined range.

23. The method of claim 22, wherein the predetermined range is approximately between 200 milliseconds and 250 milliseconds.

24. The method of claim 22, wherein on-off-on power transitions having durations less than the predetermined range are not used to cycle through the states.

* * * * *